United States Patent Office 3,575,906
Patented Apr. 20, 1971

3,575,906
VINYL CHLORIDE POLYMER MIXTURES FOR THE PREPARATION OF TRANSPARENT RIGID SHEETS
Gerhard Kuhne, Burghausen (Salzach), and Erich Zentner, Burgkirchen (Alz), Germany, assignors to Farbwerke Hoechst Aktiengesellschaft vormals Meister Lucius & Bruning, Frankfurt am Main, Germany
No Drawing. Filed June 7, 1968, Ser. No. 735,164
Claims priority, application Germany, June 13, 1967, F 52,663
Int. Cl. C08f 29/24, 37/18, 45/58
U.S. Cl. 260—23.7    4 Claims

ABSTRACT OF THE DISCLOSURE

The present invention relates to rigid sheets on the basis of polyvinyl chloride, plastomers and elastomers, said sheets being obtained by a calendering process. The material comprises (a) an emulsion homo- or copolymer of vinyl chloride, (b) a suspension polymer of vinyl chloride, (c) a graft copolymer of vinyl chloride based on a cross-linked copolymer of a conjugated diene and acrylo- or methacrylonitrile, and eventually (d) a cross-linked elastomeric copolymer similar to the basic copolymer of (c). The sheets according to the invention have an improved impact resistance and deep-drawing properties in combination with a good transparency and good other physical constants.

---

The present invention relates to rigid sheets on the basis of plastomers and elastomers, said sheets being obtained by a calendering process.

Canadian Patent No. 772,220 discloses a process for the preparation of rigid sheets of polyvinyl chloride which consists in calendering mixtures of (a) 50 to 70 percent by weight of an emulsion homo- or copolymer of vinyl chloride having a K value within the range 58 to 72, preferably 58 to 60, (b) 10 to 30 percent by weight of a suspension polymer of vinyl chloride having a K value within the range 50 to 65, preferably 50 to 55, (c) 0.5 to 40 percent by weight of a graft copolymer of vinyl chloride which has been prepared by the emulsion polymerization process and in which the vinyl chloride is grafted on a cross-linked copolymer of a conjugated diene and acrylonitrile or methacrylonitrile having a gel content of more than 90% (determined by extracting for 8 hours with toluene in a Soxhlet apparatus and subsequently drying, the method having been described in J. Polym. Science 3, 1948, page 576), the graft copolymer being insoluble in organic solvents. Advantageously, the mixture also contains (d) 1 to 10 percent by weight of a cross-linked elastomeric copolymer which has been prepared by the emulsion polymerization process from a conjugated diene and acrylonitrile or methacrylonitrile, the elastomeric copolymer being insoluble in the conventional organic solvents and having a gel content of more than 80%.

As monomers that may be copolymerized with vinyl chloride to yield the aforesaid component (a) there may be used vinylidene chloride, organic vinyl esters of carboxylic acids, for example, vinyl acetate or vinyl propionate, esters of acrylic, methacrylic, maleic, fumaric or itaconic acid and straight-chain or branched alcohols having 1 to 10 carbon atoms. As conjugated dienes for the preparation of components (c) and (d) there may be used, for example, butadiene, chloroprene and methyl butadiene. Cross-linked mixing components (c) and (d) are insoluble in organic solvents such as aliphatic or aromatic hydrocarbons or chlorinated hydrocarbons and aromatic ketones.

The rigid sheets so obtained distinguish over normal sheets of polyvinyl chloride by an improved impact resistance accompanied by good strength properties, a good shock resistance at low temperatures, a suitability for deep-drawing and a good transparency; moreover, with the use of stabilizers that are physiologically unobjectionable for polyvinylchloride obtained by the emulsion polymerization process, they can be stabilized to satisfy the foodstuff laws.

The advantage of this mixture resides in the combination of an improved impact resistance and deep-drawing properties in conjuncture with a good transparency and good other physical constants.

Now we have found that the transparency of the rigid sheets obtained by the above-described calendering process can essentially be increased, without the impact resistance being impaired to a noticeable degree and without the other physical constants being adversely affected, by increasing component (b) from the previously used 10 to 30 parts to 30 to 80 parts at the expense of component (a), so that the mixtures of such calendering batches consist of (a) 10 to 50% by weight of an emulsion homo- or copolymer of vinyl chloride having a K value within the range of 55 to 72, preferably 55 to 60, (b) 30 to 80% by weight of a suspension polymer of vinyl chloride having a K value within the range of 50 to 65, preferably 50 to 55, (c) 0.5 to 40% by weight of a graft copolymer of vinyl chloride which has been prepared by the emulsion polymerization process and in which the vinyl chloride is grafted on a cross-linked copolymer of a conjugated diene and acrylonitrile or methacrylonitrile having a gel content of more than 90%, the graft copolymer being insoluble in the conventional organic solvents. Advantageously, the mixture also contains (d) 1 to 10% by weight of a cross-linked elastomeric copolymer which has been prepared by the emulsion polymerization process from a conjugated diene and acrylonitrile or methacrylonitrile, the elastomeric copolymer being insoluble in the conventional organic solvents and having a gel content of more than 80%.

Owing to the polymer mixture having a lesser proportion of emulsion-polyvinylchloride, the stabilization must be more directed to the suspension polymer. Exemplary of the stabilizers that may be used are the organotin compounds known per se, such as di-n-octyl-tin-bis-thioglycolic acid octyl ester or n-butyl-thiostannic acid alone or in admixture with one another, for example with di-tertiary-butyl-para-cresol, trinonyl-phenyl-phosphite, aminocrotonic acid ester or α-phenyl indole, furthermore other stabilizers known per se, for example diphenyl thiourea, calcium-zinc stearate or epoxidized soybean oil in conformity with the use of the rigid sheet obtained, for example, as packing material for foodstuffs.

A special advantage of the present invention resides in the fact that the proportions of the individual components may be varied at will within the indicated ranges of the mixture, depending on which property of the sheet is especially evaluated without, however, reducing the high transparency nor impairing the impact resistance as well as the other characteristic properties to a noticeable degree.

The mixtures of the invention are worked up as described in Canadian Patent No. 772,220 in known manner by mixing the batches without heating, gelatinizing and homogenizing them on a known plasticator, and processing them into sheets of a uniform thickness on a commercially available calender. When subjecting the mixtures of the invention to the usual processing conditions, no differences ensue as compared with the mixtures described in Canadian Patent 772,220.

Lubricants, for example waxes and/or fatty alcohols or fatty acid esters, may be added to the mixtures of the invention known manner as auxiliary agents.

The following examples serve to illustrate the variations according to the invention as well as the properties of the products obtained but they are not intended to limit the procedure to the formulations given hereunder:

EXAMPLE 1

Components (a) through (d)

(a) 12.0% of an emulsion polymer of vinyl chloride having a K value of 60,
(b) 80.0% of a pure suspension polyvinyl chloride having a K value of 55,
(c) 7.0% of an emulsion graft copolymer consisting of 60 parts vinyl chloride +40 parts butadiene-acrylonitrile (90:10),
(d) 1.0% of an elastomeric copolymer of butadiene-acrylonitrile (90:10), and 1.5 parts of di-n-octyl-tin-bis-thioglycolic acid octyl ester, calculated on the polymer mixture.

Sheets processed from this bath were distinguished by an especially

High transparency, turbidity number (turbidity number determined according to DIN specification No. 53490): 15%o
Good tensile strength (determined according to DIN specification No. 53371): 500 kp./cm.$^2$
Good impact resistance (determined according to DIN specification No. 53448): 450 cmkp./cm.$^2$
Good shock resistance at low temperatures (determined by the loop hammer test: $-5°$ C.
Good deep-drawing properties (drawing ratio h:d =1:1.5): 5 to 12 seconds processing tolerance However, if only component (b) was used with the addition of di-n-octyl-tin-bis-thioglycolic acid octyl ester, a sheet was obtained which, with a turbidity number of 15%o and an impact resistance of 350 cmkp./cm.$^2$, had the unsatisfactory shock resistance at low temperatures of $+5°$ C.

EXAMPLE 2

Components (a) through (c)

(a) 17.5% of an emulsion polymer of vinyl chloride having a K value of 60,
(b) 75.0% of a suspension polyvinyl chloride copolymer with 10% vinyl acetate,
(c) 7.5% of an emulsion graft copolymer of 75 parts vinyl chloride and 25 parts butadieneacrylonitrile (90:10), and 0.4 part n-butylthiostannic acid,
0.25 part di-tertiary-butyl-para-cresol,
0.25 part trinonyl phenyl phosphite
1.0 part aminocrotonic acid ester,
calculated on the polymer mixture.

Sheets obtained from the batch had a

Good transparency, turbidity number: 15%o
Good tensile strength: 500 kp./cm.$^2$
Good impact resistance: 430 cmkp./cm.$^2$
Good shock resistance at low temperatures: $-5°$ C.
Very good deep-drawing properties: 5 to 15 seconds processing tolerance

EXAMPLE 3

Component (a) 28% of an emulsion polymer of vinyl chloride having a K value of 60, (b) 60% of a pure suspension polyvinyl chloride having a K value of 60,
(c) 7.5% of an emulsion graft copolymer of 75 parts vinyl chloride and 16 parts butadiene-acrylonitrile (90:10),
(d) 1% of an elastomeric copolymer of butadieneacrylonitrile (90:10), and 0.5 part diphenyl thiourea, and
3.0 parts expoxidized soybean oil,
calculated on the polymer mixture.

Sheets obtained from this batch had a

Good transparency, turbidity number: 18%o
Good tensile strength: 500 kp./cm.$^2$
Good impact resistance: 450 cmkp./cm.$^2$
Good shock resistance at low temperatures: $-10°$ C.
Good deep-drawing properties: 5 to 11 seconds processing tolerance.

If these values were compared to those obtained with the rigid sheets according to Canadian Patent No. 772,220, it was found that with the process of the invention there was obtained, without impairment of the other properties, a highly transparent bright color rigid sheet whose turbidity number could be improved from 25%o to 18%o.

On account of their excellent properties the sheets obtained by the process of the invention may be employed in many fields. They may, above all, be used with special advantage as packing materials due to their transparency, tensile strength and shock resistance at low temperatures; when using a physiologically harmless stabilizer in compliance with the regulations of the laws on packaging foodstuffs, they may also be employed for packaging foodstuffs.

We claim:

1. In a rigid sheet based on plastomers and elastomers obtained by calendering mixtures of
(a) an emulsion homo or copolymer of vinyl chloride with a member selected from the group consisting of vinylidene chloride; vinyl acetate; vinyl propionate and an ester of an alcohol having 1–10 carbon atoms with an acid selected from the group consisting of an acrylic, methacrylic, maleic, fumaric or itaconic acid; said polymer having a K value of 55–72;
(b) a suspension homopolymer of vinyl chloride having a K value of 50–65; and
(c) a graft copolymer obtained by emulsion polymerization wherein vinyl chloride is grafted on a crosslinked copolymer of
(1) a conjugated diene selected from the group consisting of butadiene, methyl butadiene and chloroprene, and
(2) acrylonitrile or methacryonitrile; said graft copolymer having a gel content exceeding 90%; the improvement which comprises employing about 10–50% by total polymeric weight of component (a), about 30–80% by weight of component (b) and about 0.5–40% by weight of component (c); said rigid sheet containing, as a stabilizer, members selected from the group consisting of di-n-octyl-tin-bis-thioglycolic acid octyl ester, n-butyl-thiostannoic acid, di-tertiary-butyl-paracresol, trinonyl-phenyl-phosphite, aminocrotonic acid ester, α-phenyl indole, calcium zinc stearate, diphenyl thiourea and epoxidized soybean oil.

2. The rigid sheet of claim 1 containing a lubricating agent.

3. A rigid sheet as claimed in claim 2 which contains as lubricating agent a wax, a fatty alcohol or a fatty acid ester.

4. The rigid sheet of claim 1 containing as added component about 1–10% by weight of (d) a cross-linked elastomeric polymer obtained by emulsion polymerization of a conjugated diene of
(1) a member selected from the group consisting of butadiene, methylbutadiene and chloroprene with
(2) acrylonitrile or methacrylonitrile; the elastomeric copolymer being insoluble in the conventional organic solvents and having a gel content of more than 80%.

References Cited

UNITED STATES PATENTS

| | | | |
|---|---|---|---|
| 2,595,619 | 5/1952 | Voorthuis | 260—45.8 |
| 2,924,545 | 2/1960 | Daly | 260—891 |
| 3,262,896 | 7/1966 | Ackerman | 260—23 |
| 3,281,345 | 10/1966 | Kuhne | 260—891 |
| 3,283,034 | 11/1966 | Urbanic et al. | 260—891 |
| 3,297,791 | 1/1967 | Heaps | 260—876 |
| 3,322,858 | 5/1967 | Coaker et al. | 260—876 |
| 3,327,022 | 6/1967 | Riou et al. | 260—879 |
| 3,367,997 | 2/1968 | Smith | 260—891 |
| 3,377,304 | 4/1968 | Kuester et al. | 260—23 |
| 3,406,136 | 10/1968 | Scarso et al. | 260—23.7 |

DONALD E. CZAJA, Primary Examiner

R. A. WHITE, Assistant Examiner

U.S. Cl. X.R.

260—23, 28.5, 31.2, 33.4, 45.7, 45.75, 45.8, 45.85, 45.9, 45.95, 876, 879, 891, 899